United States Patent [19]

Okiyama

[11] Patent Number: 5,254,833
[45] Date of Patent: Oct. 19, 1993

[54] BRITTLE MATERIAL CLEAVAGE-CUTTING APPARATUS

[75] Inventor: Toshihiro Okiyama, Himeji, Japan

[73] Assignee: Soei Tsusho Company, Ltd., Osaka, Japan

[21] Appl. No.: 935,906

[22] Filed: Aug. 27, 1992

[30] Foreign Application Priority Data

Jan. 11, 1991 [JP] Japan ................................. 3-2026

[51] Int. Cl.$^5$ .............................................. B23K 26/00
[52] U.S. Cl. .................................. 219/121.68; 65/105; 65/112; 219/121.8
[58] Field of Search ...................... 219/121.67, 121.68, 219/121.81; 65/103, 105, 112

[56] References Cited

U.S. PATENT DOCUMENTS 5,132,505  7/1992  Zonneveld et al. ............. 219/121.6

*Primary Examiner*—C. L. Albritton
*Attorney, Agent, or Firm*—Wenderoth, Lind & Ponack

[57] ABSTRACT

The brittle material cleavage-cutting apparatus of the present invention comprises a placing stand for holding a brittle material and beam scanning device for deflecting a laser beam from a laser source so that a brittle material placed on the placing stand is scanned along a planned cleavage-cutting line. By the beam scanning device, the laser-beam irradiation position on the brittle material is repeatedly moved in short cycles along the planned cleavage-cutting line.

7 Claims, 2 Drawing Sheets

BRITTLE MATERIAL CLEAVAGE-CUTTING APPARATUS

BACKGROUND OF THE INVENTION

The present invention relates to apparatus for cleavage-cutting brittle material such as ceramics, semiconductor wafers or the like, with the utilization of thermal stress generated by irradiating a laser beam on such brittle material.

As a method of cutting a semiconductor wafer or the like, there is known, for example, a method by which a laser beam focused in a narrow range is irradiated onto a wafer, causing the wafer to be locally dissolved or evaporated, and the laser-beam irradiating position is moved in the cutting direction, thereby cutting the wafer.

In this cutting method using such laser beam, however, the substances dissolved or evaporated by the irradiation of a laser beam stick to the surfaces of devices formed on the wafer such as LSIs, ICs and the like. This results in undesirable effects such as deterioration in the conductivity of the electrodes on the device surfaces.

Even though the laser beam is focused in a narrow range, the diameter of a laser-beam spot can be reduced to only about 10 $\mu$m. Accordingly, a cut allowance is inevitable. Further, the material loss due to evaporation or the like cannot be avoided.

To overcome the above-mentioned problems, there has been proposed the following technique. That is, a machining starting point is formed on a wafer by notching, chamfering or the like. A laser beam is irradiated to the wafer in the vicinity of the machining starting point to generate cracks in the wafer extending from the center of the laser-beam irradiation position to the machining starting point. Then, the laser beam is moved along the wafer cutting direction, so that thermal stress due to the laser beam accelerates the cracks, thus cleavage-cutting the wafer.

According to a cleavage-cutting apparatus using the above-mentioned technique, when a laser beam is irradiated to a wafer in the vicinity of the machining starting point, micro-cracks are generated due to compressive stress which acts on the beam center and tensile stress which acts on the periphery around the part on which the compressive stress acts. However, such micro-cracks generate radially. Accordingly, when such micro-cracks generated include micro-cracks along the planned cleavage-cutting line, no trouble is caused. However, if such micro-cracks generated do not include micro-cracks along the planned cleavage-cutting line, the cleavage-cut cannot be accurately determined.

Further, the generated micro-cracks are induced by thermal stress due to the irradiation of a laser beam, so that the thermal stress locally acts on the wafer during such an induction process. Accordingly, there are cases where micro-cracks are newly generated, resulting in the presence of a number of micro-cracks on the wafer cleavage-cut surfaces.

Further, there is required a precision mechanism for precisely relatively moving the wafer and the laser source. In particular, when the cleavage-cutting line is two-dimensional or a curved line, such a mechanism is disadvantageously very complicated.

SUMMARY OF THE INVENTION

It is an object of the present invention to provide a brittle material cleavage-cutting apparatus having a simple arrangement, with which a brittle material such as a semiconductor wafer or the like can be cleavage-cut into pieces each having a desired shape, and with which the wafer cleavage-cut surfaces can be made in the form of mirror-surfaces including less micro-cracks.

To achieve the above-mentioned object the brittle material cleavage-cutting apparatus of the present invention has a beam scanning means for deflecting a laser beam from a laser source such that a brittle material is scanned by the laser beam along a planned cleavage-cutting line. The beam scanning means is arranged such that the beam irradiating position on a brittle material is repeatedly moved several times during a cycle of, for example, a short period of time, along the planned cleavage-cutting line.

According to the cleavage-cutting apparatus of the present invention, a brittle material is repeatedly scanned by a laser beam several times at a cycle of a short period of time. Those parts of the brittle material along the planned cleavage-cutting line are uniformly heated, so that uniform isotherms are formed on the brittle material along the planned cleavage-cutting line. This also makes uniform, along the planned cleavage-cutting line, each of (i) the compressive stress which acts on the laser-beam irradiation center, and (ii) the tensile stress which acts around the laser-beam irradiation center. When the scanning by a laser beam is continued and the acting forces of the compressive stress and the tensile stress exceed the allowable stress of the brittle material, the brittle material is cracked at a stroke along the planned cleavage-cutting line in its entirety, so that the brittle material is cleavage-cut.

Attention should also be placed to the fact that the brittle material cleavage-cutting apparatus of the present invention requires no precision mechanism for precisely relatively moving a brittle material and a laser source. For example, even though a brittle material is to be cut according to a curved line, such cleavage-cutting can be readily carried out with a simple mechanism.

DETAILED DESCRIPTION OF THE INVENTION

The following description will discuss a preferred embodiment of the present invention with reference to the attached drawings.

Figure 1:
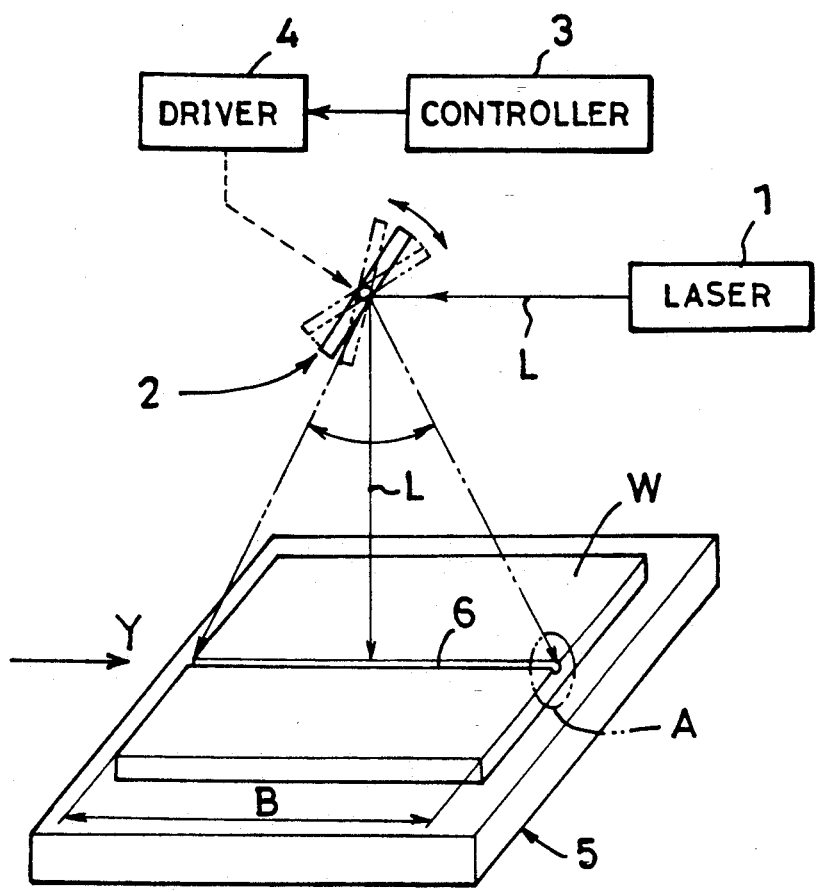
FIG. 1 is a view showing the arrangement of an embodiment of the present invention.

As shown in FIG. 1, a rotary mirror 2 is disposed in the advancing path of a laser beam L from a laser 1 such as a YAG laser or the like.

The rotary mirror 2 is driven by a control signal from a driver 4 based on an instruction from a controller 3. Upon oscillation of the rotary mirror 2, the laser beam L from the laser 1 is reflected toward a placing stand 5 and scans the placing stand 5 along the Y direction thereof.

The rotary mirror 2 is controlled by the controller 3 such that the rotary mirror 2 undergoes a simple harmonic oscillation. The number of oscillations of the rotary mirror 2 is in the range from several Hz to tens of Hz. The amplitude is set such that the scanning length of the reflected laser beam L on the surface of a wafer W placed on the placing stand 5 is equal to about a half of the length B of the wafer W.

With the above-mentioned arrangement the laser beam L from the laser 1 can be reciprocated at a constant speed in the Y direction on the surface of the wafer W placed on the placing stand 5.

The following description will discuss the operation and cleavage-cutting procedure of the embodiment of the present invention.

Figure 2:
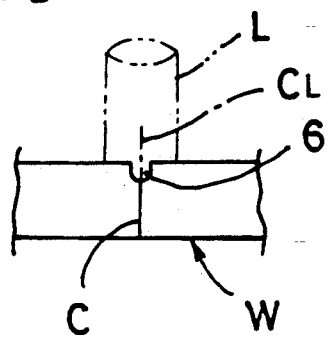
FIG. 2 is an enlarged view of a portion A in FIG. 1.

Prior to the cleavage-cutting, a groove 6 is previously formed in the wafer W along a planned cleavage-cutting line as shown in FIG. 2.

Such groove is formed by photolithography, dry-etching or the like as generally used in a process for producing a semiconductor device. The groove width is about several μm to about tens of μm.

As shown in FIG. 1, the wafer W having such a groove is placed on the placing stand 5 and the groove center CL is aligned with the center of the scanning direction of the laser beam L.

After completion of the above-mentioned setting, when the laser 1 and the rotary mirror 2 are driven, the laser beam L is irradiated to the groove 6 in the wafer W. The center of the irradiation position is repeatedly reciprocated on the groove center CL at a constant speed at a cycle on the order of 0.1 to 0.01 seconds. Such beam scanning causes the wafer groove to be uniformly heated throughout the length thereof.

Figure 3:
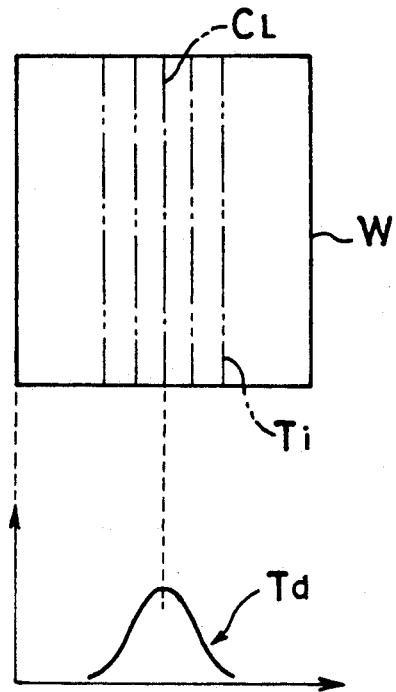
FIG. 3 is a view showing the operation of the embodiment of the present invention.

By such heating, there is formed on the wafer W a temperature distribution curve Td in which the peak is located in the groove center, as shown in FIG. 3. The temperature distribution curve Td is uniformly formed in the direction along the groove 6, so that uniform isotherms Ti are formed along the groove center CL, as shown in FIG. 3. Each of the compressive stress acting on the center of the groove 6 and the tensile stress acting on the peripheries thereof, is also made uniform along the direction in which the groove 6 extends.

When the beam scanning is continued and the acting forces resulting from the compressive stress and the tensile stress exceed the allowable stress of the wafer material, a crack C from the bottom of the groove 6 to the underside of the wafer W is generated in a stroke throughout the length of the groove 6, so that the wafer W is cleavage-cut. Since the crack C is generated in a stroke, the cleavage-cut surfaces of the wafer W are made in the form of mirror-surfaces including less micro-cracks.

In the above-mentioned embodiment, provision is made such that the rotary mirror 2 undergoes a simple harmonic oscillation with a constant angular velocity. Accordingly, the moving speed of the laser beam L on the surface of the wafer W is constant. However, the oscillation of the rotary mirror 2 may be a constant-speed oscillation, dependent on the correlation of the distance between the rotary mirror 2 and the wafer W on the placing stand 5, with respect to the length B of the wafer W, for example when the distance between the rotary mirror 2 and the wafer W is sufficiently long with respect to the length B of the wafer W.

Figure 4:
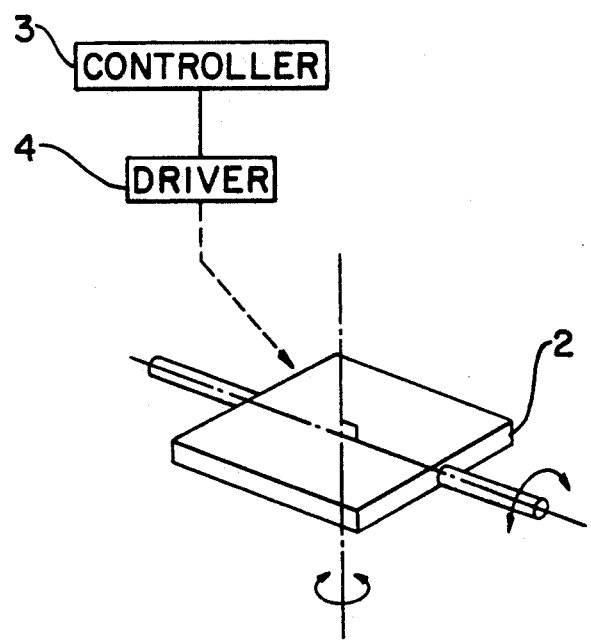
FIG. 4 is a view depicting an alternative arrangement of a beam deflecting mirror.

In the above-mentioned embodiment, the rotary mirror 2 is oscillated to cause the laser, beam to scan the wafer W in a one-dimensional direction. However, as shown in FIG. 4, provision may be made such that the rotary shaft of the rotary mirror 2 is drivingly rotated around an axis at a right angle to and passing through the center of the rotary shaft of the rotary mirror 2. This allows the laser beam to scan the wafer W in a two-dimensional manner along even a curved cleavage-cutting line.

As the laser beam L scanning means, there may be used a structure using a polygon mirror, instead of the rotary mirror 2. Alternatively, an optical fiber may be disposed in the advancing path of the laser beam L from the laser 1, and the optical path of the optical fiber may be mechanically deflected at the outlet side thereof, so that the laser beam scans the wafer W in a one-dimensional or two-dimensional manner.

In addition to the arrangement of the above-mentioned embodiment, a cooling mechanism may be disposed on the placing stand 5 to cool the underside of the wafer W. In this case, only the groove 6 is locally heated, so that the rise in the temperature distribution curve Td shown in FIG. 3 becomes sharp. This not only improves the cleavage-cutting efficiency, but also decreases the influence of heat exerted upon devices such as LSIs and the like formed on the wafer W. As the cooling mechanism of the placing stand 5, there may be employed a known structure using compressed air, liquefied nitrogen gas or water.

The planned cleavage-cutting line of the wafer W may be formed by means other than the groove 6. For example, there may be formed, on a wafer by a method of PVD, CVD or the like, a layer which has a width smaller than the laser beam diameter and which is made of a material different in physical properties, such as coefficient of thermal expansion than the wafer material. With the use of such a layer, the wafer W can be cleavage-cut in the same manner as in the case using the groove 6. Dependent on the combination of the output energy of the laser 1 with the material, shape and sizes of the wafer W, the wafer W can be cleavage-cut without a groove or the like formed therein.

The beam scanning mechanism in the above-mentioned embodiment can be readily applied to a conventional cleavage-cutting apparatus in which a laser beam is irradiated to a wafer in the vicinity of an end edge thereof to generate cracks and in which the cracks thus generated are induced in the cleavage-cutting direction by thermal stress due to the laser beam. In such an application, there is advantageously eliminated the need for a percision mechanism for precisely relatively moving the wafer and the laser source.

It is a matter of course that the cleavage-cutting apparatus of the present invention can be used for cleavage-cutting not only a semiconductor wafer, but also a variety of other brittle materials such as glass, ceramics and the like.

What is claimed is:

1. A brittle material cleavage-cutting apparatus comprising:
    a placing stand for holding a brittle material;
    a laser source for producing a laser beam; and
    beam scanning means for deflecting the laser beam toward the brittle material on said placing stand and for causing the position at which the laser beam irradiates the brittle material to move in two dimensions along a predetermined cleavage-cutting line;

wherein said beam scanning means comprises a rotary mirror rotatable about two perpendicular axes and disposed in the advancing path of the laser beam from said laser source.

2. A brittle material cleavage-cutting apparatus according to claim 1, wherein said beam scanning means is operable to repeatedly scan the brittle material with the laser beam at a predetermined cycle.

3. A brittle material cleavage-cutting apparatus according to claim 2, wherein said beam scanning means is operable to repeatedly scan the brittle material with the laser beam at a cycle of not greater than 100 Hz.

4. A brittle material cleavage-cutting apparatus according to claim 1, wherein said beam scanning means further includes a drive mechanism operably coupled with said rotary mirror for imparting a motion to said mirror to change the angle formed by the reflecting surface of said mirror with respect to the laser beam advancing direction.

5. A brittle material cleavage-cutting apparatus according to claim 4, wherein said drive mechanism is operable to impart to said rotary mirror a simple harmonic oscillation.

6. A brittle material cleavage-cutting apparatus according to claim 4, wherein said drive mechanism is operable to impart to said rotary mirror a constant-speed oscillation.

7. A brittle material cleavage-cutting apparatus according to claim 1, further comprising a cooling mechanism mounted on said placing stand for cooling an underside of the brittle material when placed on said placing stand.

* * * * *